(12) United States Patent
Huang-Tsai

(10) Patent No.: US 8,231,134 B2
(45) Date of Patent: Jul. 31, 2012

(54) VEHICLE PEDAL

(76) Inventor: Li-Yueh Huang-Tsai, Tainan (TW)

( * ) Notice: Subject to any disclaimer, the term of this patent is extended or adjusted under 35 U.S.C. 154(b) by 261 days.

(21) Appl. No.: 12/772,243

(22) Filed: May 3, 2010

(65) Prior Publication Data

US 2011/0266766 A1 Nov. 3, 2011

(51) Int. Cl.
*B60R 3/00* (2006.01)

(52) U.S. Cl. ...................... 280/169; 280/163

(58) Field of Classification Search .................. 280/163, 280/164.1, 164.2, 169
See application file for complete search history.

(56) References Cited

U.S. PATENT DOCUMENTS

| | | | | |
|---|---|---|---|---|
| 1,896,797 A | * | 2/1933 | Leamy | 280/169 |
| 1,939,604 A | * | 12/1933 | Bronson | 280/163 |
| 2,077,822 A | * | 4/1937 | Baker | 280/163 |
| 2,084,014 A | * | 6/1937 | Bronson | 280/169 |
| 4,203,611 A | * | 5/1980 | Makela | 280/163 |
| 5,769,439 A | * | 6/1998 | Thompson | 280/163 |
| 8,002,299 B2 | * | 8/2011 | Huang-Tsai | 280/169 |
| 8,016,309 B2 | * | 9/2011 | Flajnik et al. | 280/169 |
| 2005/0179226 A1 | * | 8/2005 | Kolpasky et al. | 280/163 |

* cited by examiner

*Primary Examiner* — Hau Phan

(57) ABSTRACT

A vehicle pedal includes a main pedal and a cover. The main pedal has a supporting surface, a groove formed in the supporting surface, plural positioning bases located in the groove, and a through hole bored in each of the positioning bases. The cover has a grooved rail for being assembled in the groove. Plural screws have their heads confined in the grooved rail and their shanks extended out of the grooved rail into the through holes of the main pedal. A washer and a nut are mounted around each of the shanks. So with the heads of the screws restrained in the grooved rail and with the shanks of the screws inserted in the through holes, not only can the cover be quickly fixed on the main pedal, but also the screws can be hidden in the cover to achieve an aesthetic integral appearance.

1 Claim, 7 Drawing Sheets

VEHICLE PEDAL

BACKGROUND OF THE INVENTION

1. Field of the Invention

This invention relates to a vehicle pedal, particularly to one able to be swiftly assembled by means of plural screws that have their heads restrained in a grooved rail located at the bottom of a cover and their shanks inserted in through holes bored in a main pedal, also having the screws hidden in the cover to achieve an aesthetic integral appearance.

2. Description of the Prior Art

Commonly, a vehicle like a recreation van, an SUV (sport utility vehicle) or a business van has a rather highly-elevated body so that it is inconvenient for passengers like the aged, children or people with disabilities to get on and off. To offset the inconvenience, a pedal is thus assembled at two sides of the van respectively to help passengers get on and off. As shown in FIGS. 1 and 2, a conventional pedal 1 is provided with a groove 10, a supporting surface 11 formed in the groove 10, and a cover 14 laid on the supporting surface 11. Plural anti-slipping projections 12 are extruded upwards from the supporting surface 11 and plural threaded holes 13 are bored in the supporting surface 11. The cover 14 is provided with plural through holes 15 and 16 respectively corresponding to the anti-slipping projections 12 and the threaded holes 13. Finally, a screw 17 is inserted through each of the through holes 16 to engage with each corresponding threaded hole 13 so as to make the cover 14 fixed with the pedal 1. However, it takes a long time to one by one have the screws 17 inserted through the through holes 16 of the cover 14 to engage with the threaded holes 13 in assembling the pedal 1. Moreover, as the screws 17 extend out of the cover 14, they not only downgrade the whole appearance of the pedal 1, but also are apt to get rusted to shorten service life.

SUMMARY OF THE INVENTION

The object of this invention is to offer a vehicle pedal that can have its cover quickly assembled on a main pedal, with screws hidden in the cover to achieve an aesthetic integral appearance.

The main characteristics of the invention are a main pedal and a cover. The main pedal is provided with a supporting surface, a groove formed in the supporting surface, plural positioning bases located equidistantly in the groove, and a through hole bored in each of the positioning bases. The cover is laid on the supporting surface of the main pedal, provided with plural anti-slipping projections and a grooved rail located at the bottom for being assembled in the groove of the main pedal. In addition, plural screws have their heads confined in the grooved rail and their shanks extended out of the grooved rail to insert in the through holes of the main pedal. A washer and a nut are mounted around each of the shanks of the screws.

BRIEF DESCRIPTION OF DRAWINGS

This invention is better understood by referring to the accompanying drawings, wherein.

DETAILED DESCRIPTION OF THE PREFERRED EMBODIMENT

Figure 1:
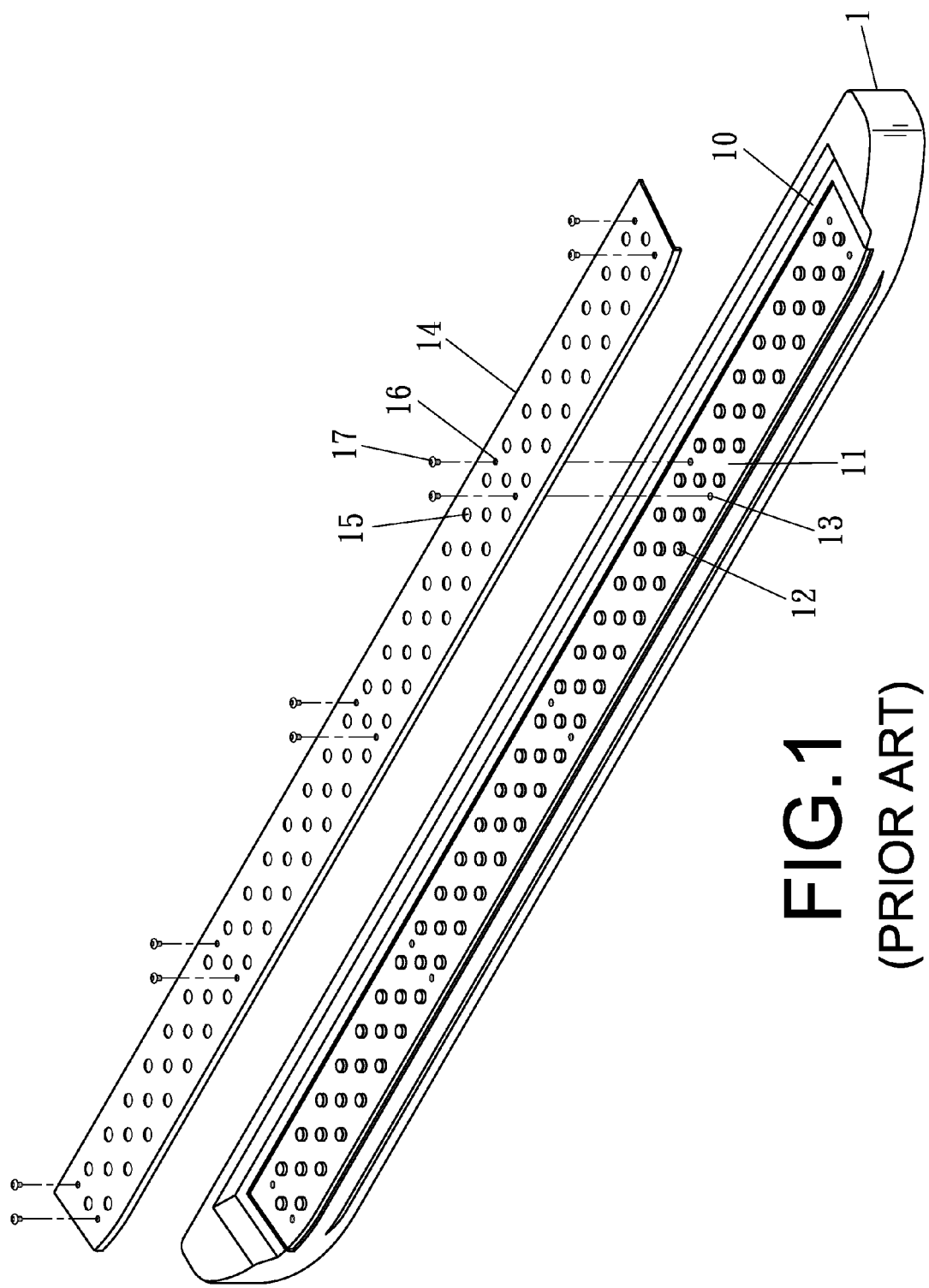
FIG. 1 is an exploded perspective view of a conventional vehicle pedal.
Figure 2:
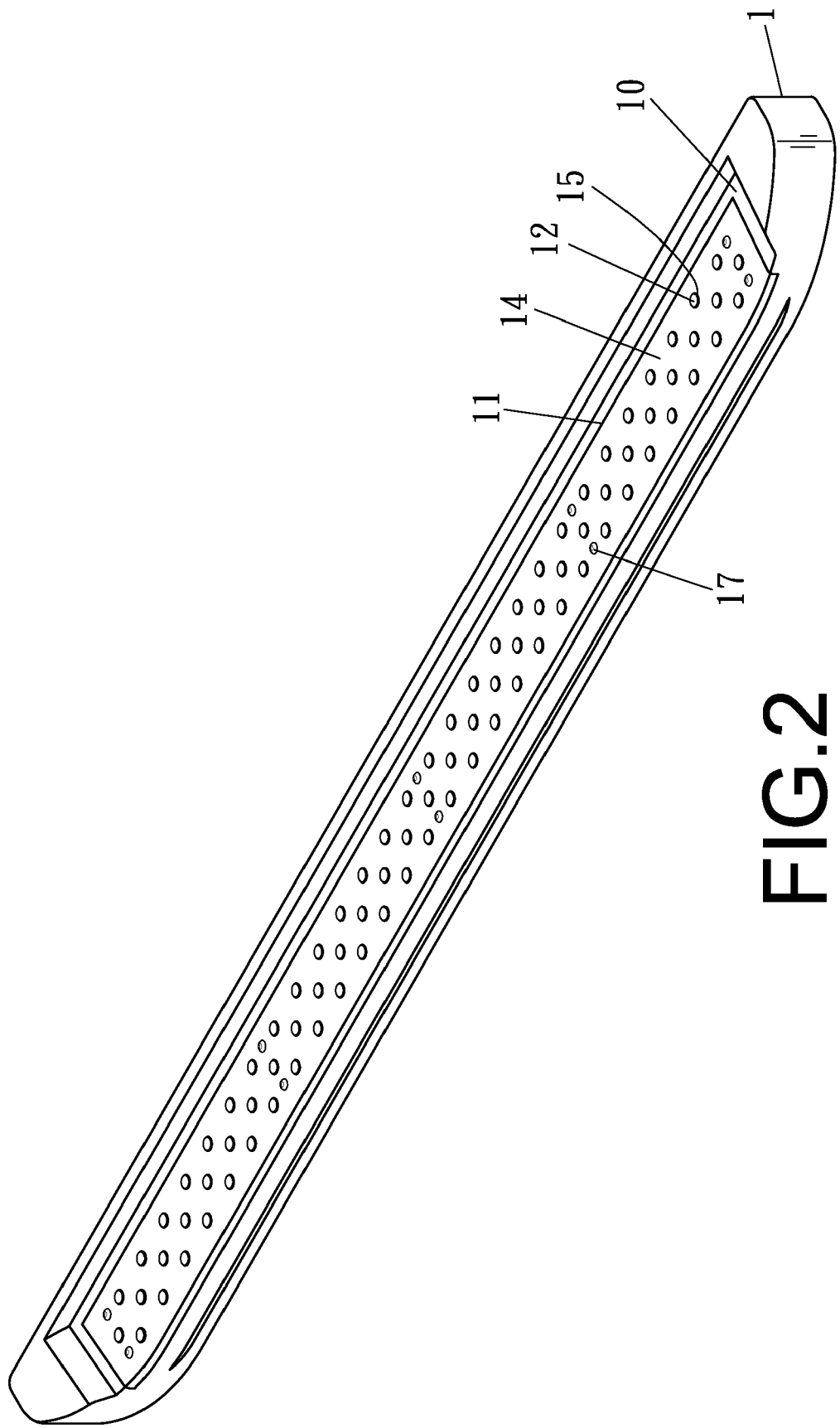
FIG. 2 is a perspective view of the conventional vehicle pedal.
Figure 3:
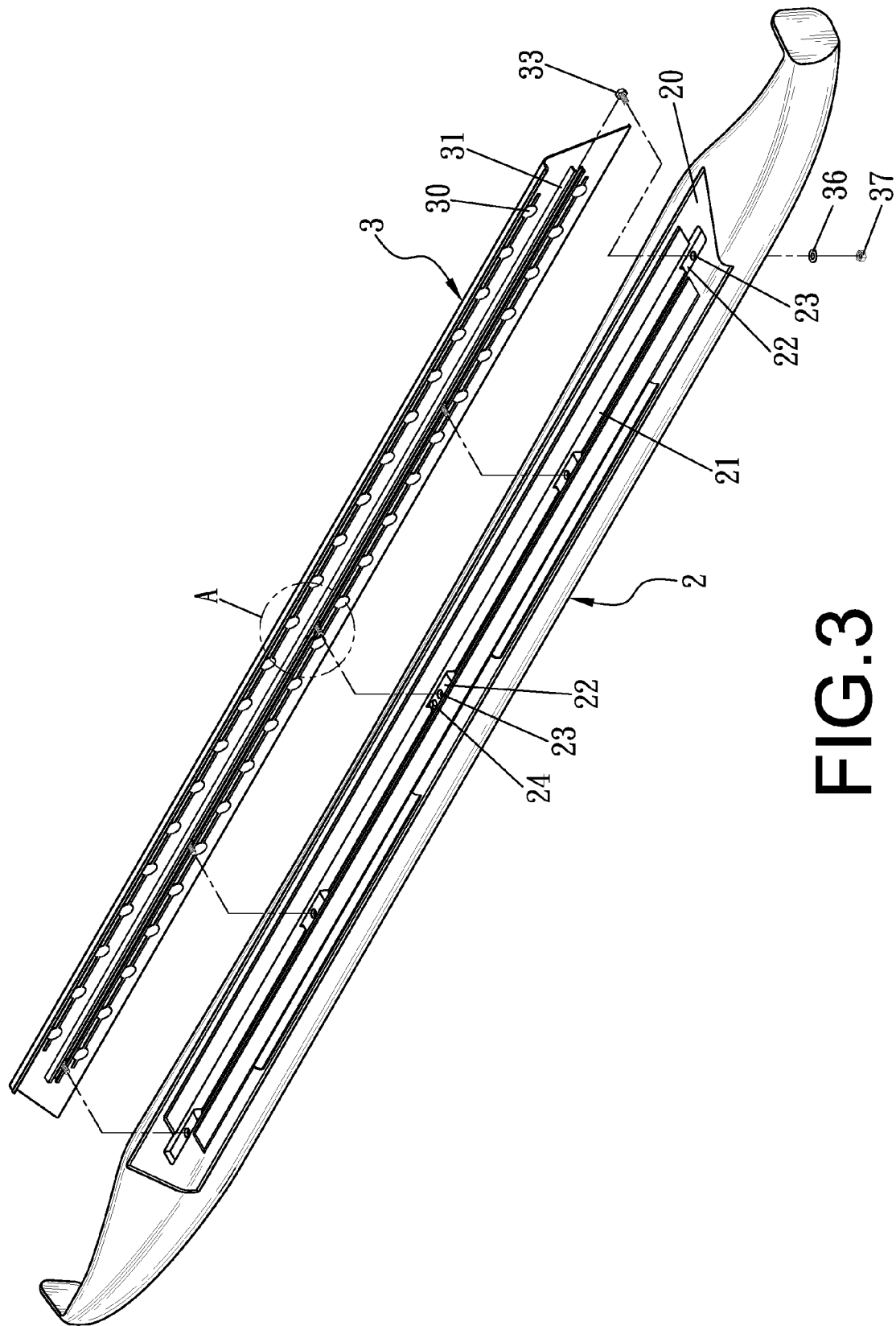
FIG. 3 is an exploded perspective view of a preferred embodiment of a vehicle pedal in the present invention.
Figure 4:
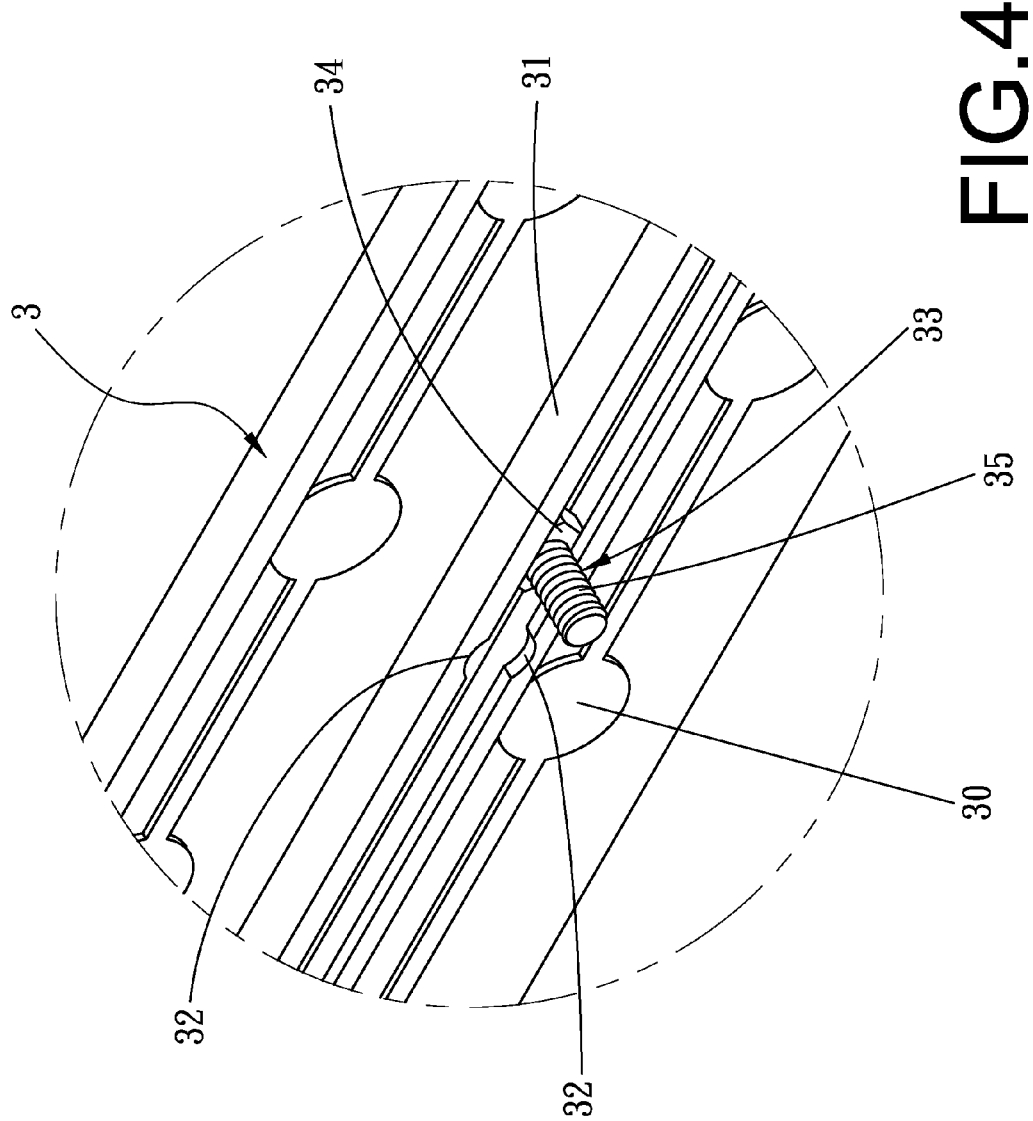
FIG. 4 is a magnified perspective view of the portion marked with in FIG. 3.
Figure 5:
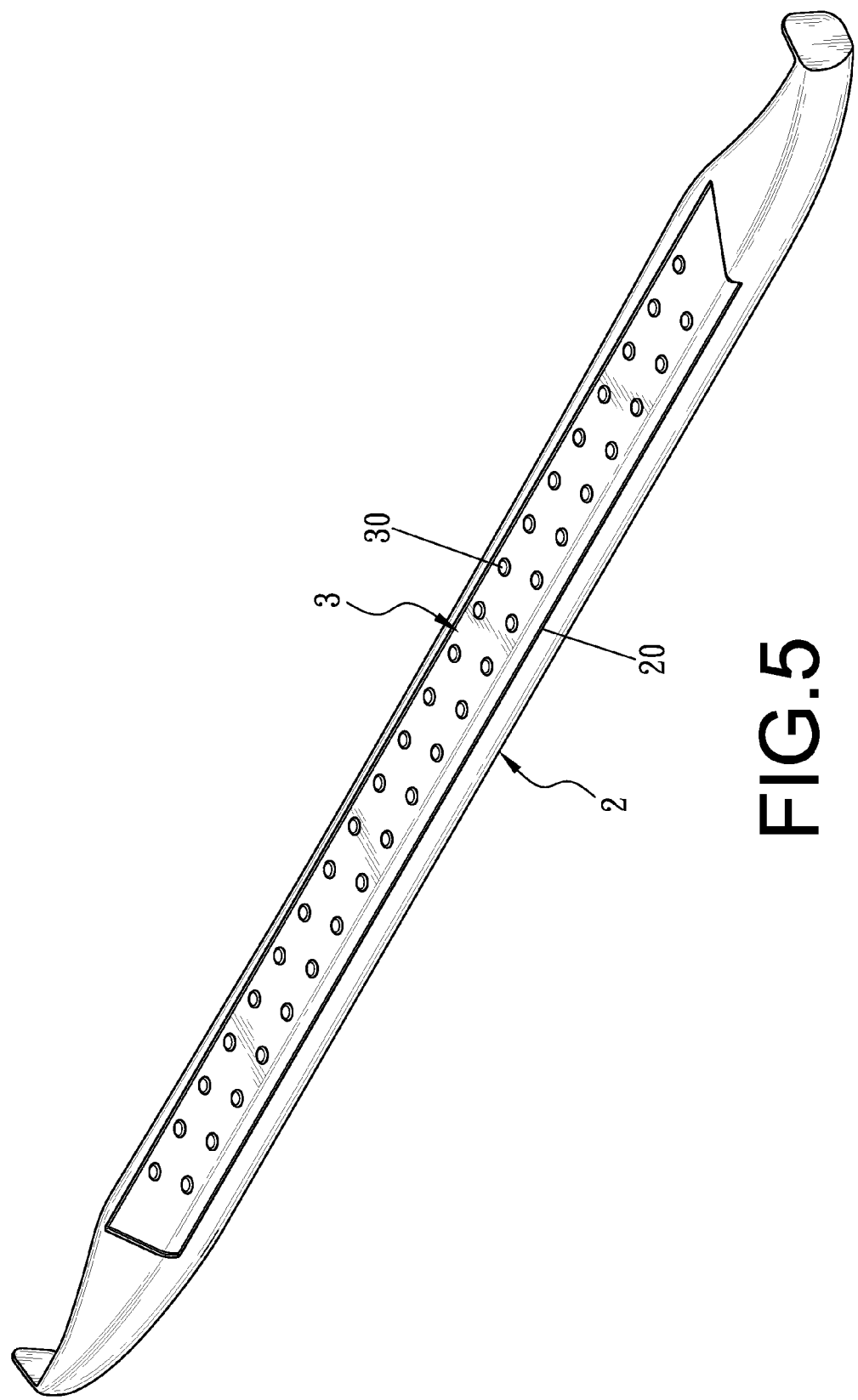
FIG. 5 is a perspective view of the preferred embodiment of a vehicle pedal in the present invention.
Figure 6:
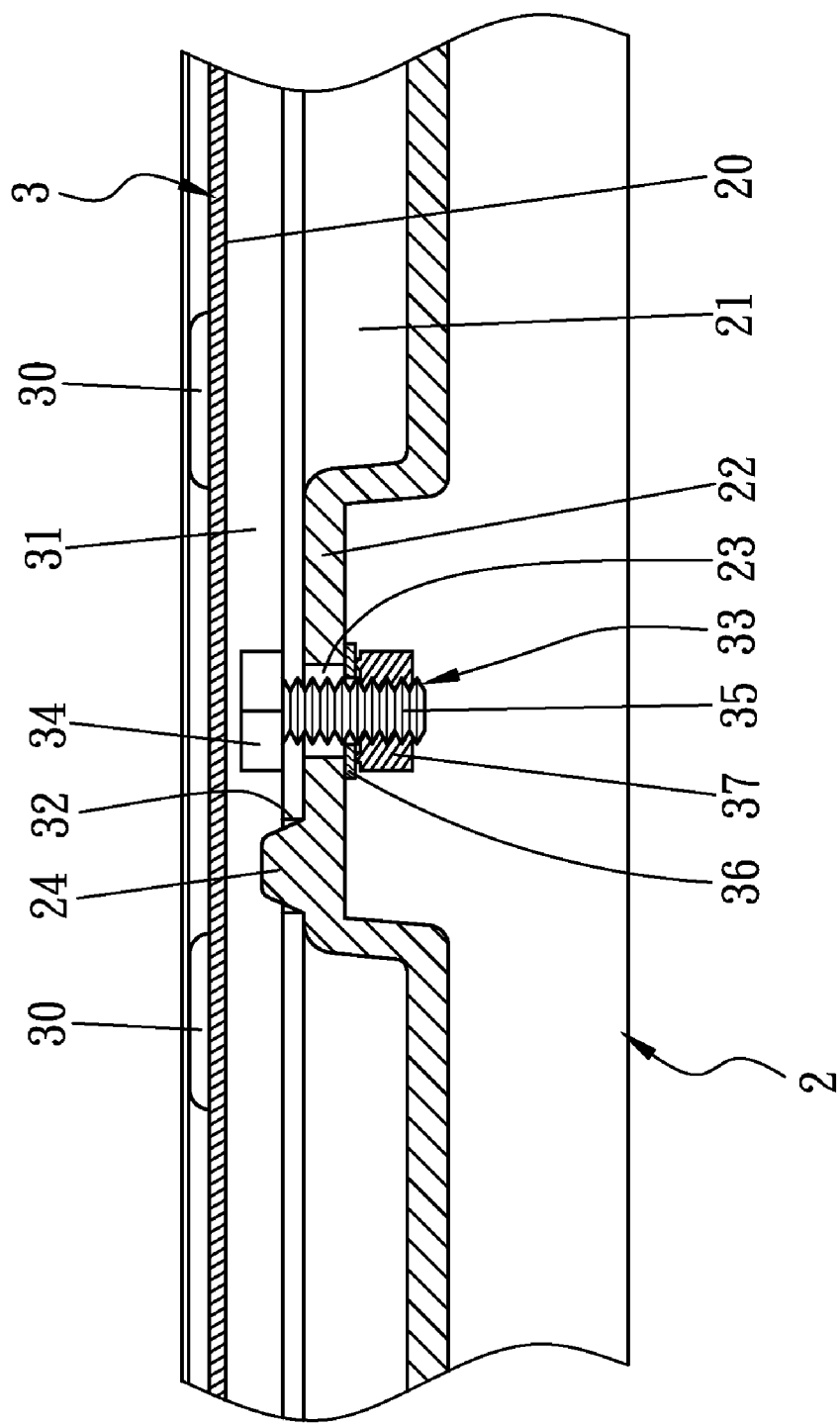
FIG. 6 is a partial cross-section view of the preferred embodiment of a vehicle pedal in the present invention.
Figure 7:
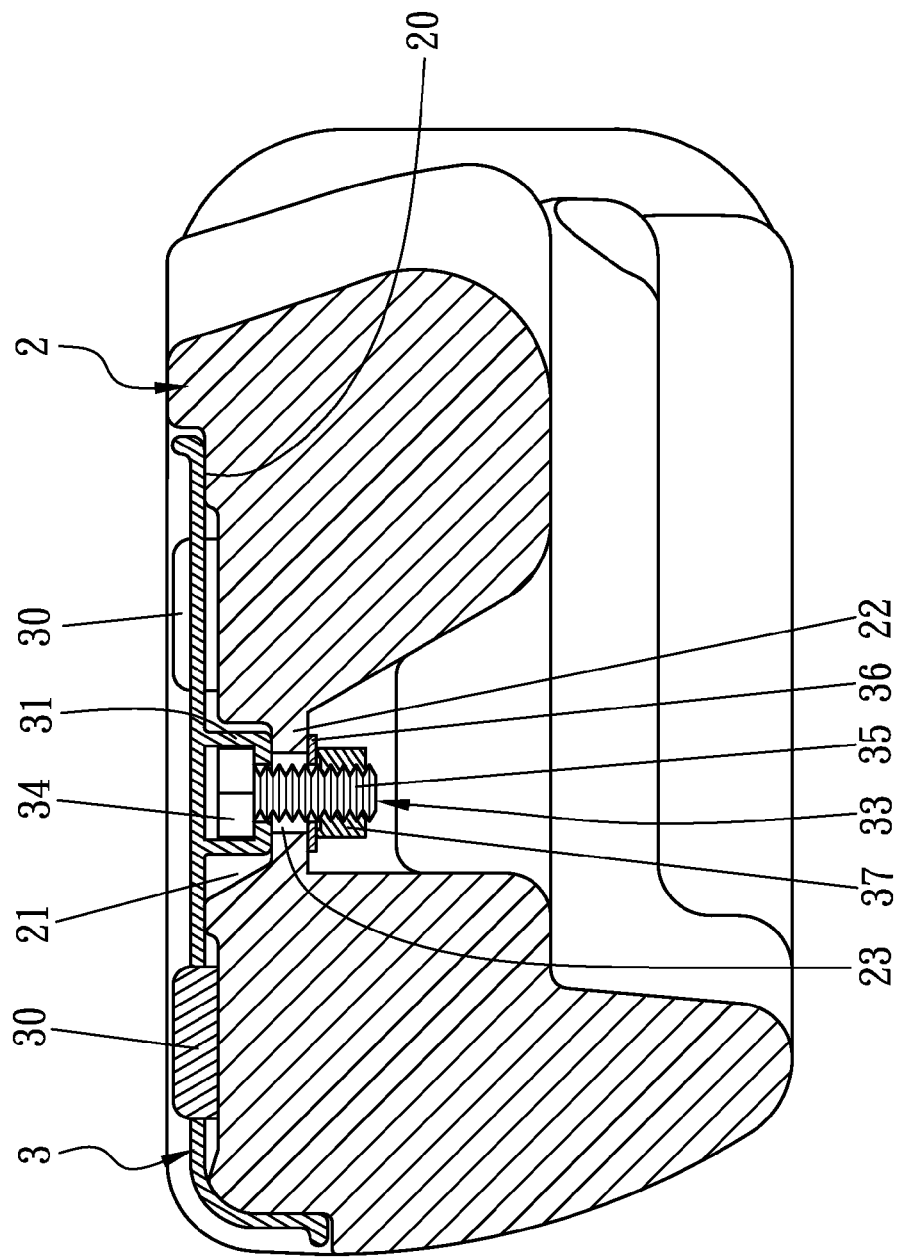
FIG. 7 is a side cross-section view of the preferred embodiment of a vehicle pedal in the present invention.

As shown in FIGS. 3 and 4, a preferred embodiment of a vehicle pedal in the present invention is provided with a main pedal 2 and a cover 3.

The main pedal 2 is provided with a supporting surface 20, a groove 21 formed in the supporting surface 20, plural positioning bases 22 located equidistantly in the groove 21, a through hole 23 bored in each of the positioning bases 22, and a positioning projection 24 formed on an intermediate one of the positioning bases 22.

The cover 3 is laid on the supporting surface 20 of the main pedal 2, provided with plural anti-slipping projections 30 properly spaced apart, a grooved rail 31 located at the bottom, and a plurality of screws 33. A pair of recesses 32 is correspondingly formed in two sides of the grooved rail 31. The screws 33 have their heads 34 inserted inside the grooved rail 31 and their shanks 35 extended outside the grooved rail 31. Mounted around each of shanks 35 of the screws 33 are a washer 36=and a nut 37.

In assembling, as shown in FIGS. 3~7, the heads 34 of the screws 33 are first successively inserted from one side of and into the grooved rail 31, with the shanks 35 extending out of the grooved rail 31, so that the screws 33 can move to and fro in the grooved rail 31. The screws 33 are next moved to individually correspond to the through holes 23 of the positioning bases 22 of the main pedal 2. Then, the cover 3 is put on the supporting surface 20, with the positioning projection 24 on the intermediate positioning base 22 fixed in the corresponding recess 32, with the shanks 35 of the screws 33 respectively inserted in the through holes 23 of the positioning bases 22 and with the grooved rail 31 of the cover 3 confined in the groove 21 of the main pedal 2. The following step is to engage the washers 36 and the nuts 37 with the shanks 35 of the screws 33 at the bottom so as to fix the cover 3 on the main pedal 2 stably. So with the heads 34 of the screws 33 restrained in the grooved rail 31 at the bottom of the main pedal 3 and with the shanks 35 of the screws 33 inserted in the through holes 23 at the bottom of the main pedal 2, making the screws 33 hidden in the cover 3, not only can the cover 3 be swiftly assembled on the main pedal 2, but also the pedal can obtain an aesthetic integral appearance and the screws 33 can be prevented from being severely rusted due to direct exposure to atmosphere.

While the preferred embodiment of the invention has been described above, it will be recognized and understood that various modifications may be made therein and the appended claims are intended to cover all such modifications that may fall within the spirit and scope of the invention.

What is claimed is:

1. A vehicle pedal comprising:

a main pedal (2) provided with a supporting surface (20), a groove (21) formed in the supporting surface (20), plural positioning bases (22) located equidistantly in the groove (21), each of the positioning base 22 being bored with a through hole 23, and a positioning projection (24) formed on an intermediate one of the positioning bases 22.

a cover (3) laid on the supporting surface (20) of the main pedal (2), provided with plural anti-slipping projections (30) properly spaced apart, a grooved rail (31) located at the bottom, and a plurality of screws (33); a pair of recesses (32) being correspondingly formed in two sides of the grooved rail (31); the screws (33) having their heads (34) inserted inside the grooved rail (31) and their shanks (35) extended outside the grooved rail (31); each of shanks (35) of the screws (33) being mounted with a washer (36) and a nut (37);

wherein in assembling, the heads (34) of the screws (33) being first successively inserted from one side of and into the grooved rail (31), with the shanks (35) extending out of the grooved rail (31), so that the screws (33) can move to and fro in the grooved rail (31); the screws (33) are next moved to individually correspond to the through holes (23) of the positioning bases (22) of the main pedal (2); then, the cover (3) is put on the supporting surface (20) with the positioning projection (24) on the intermediate positioning base (22) fixed in the corresponding recess (32); with the shanks (35) of the screws (33) respectively inserted in the through holes (23) of the positioning bases (22) and with the grooved rail (31) of the cover (3) confined in the groove (21) of the main pedal (2).

* * * * *